Patented Nov. 3, 1931

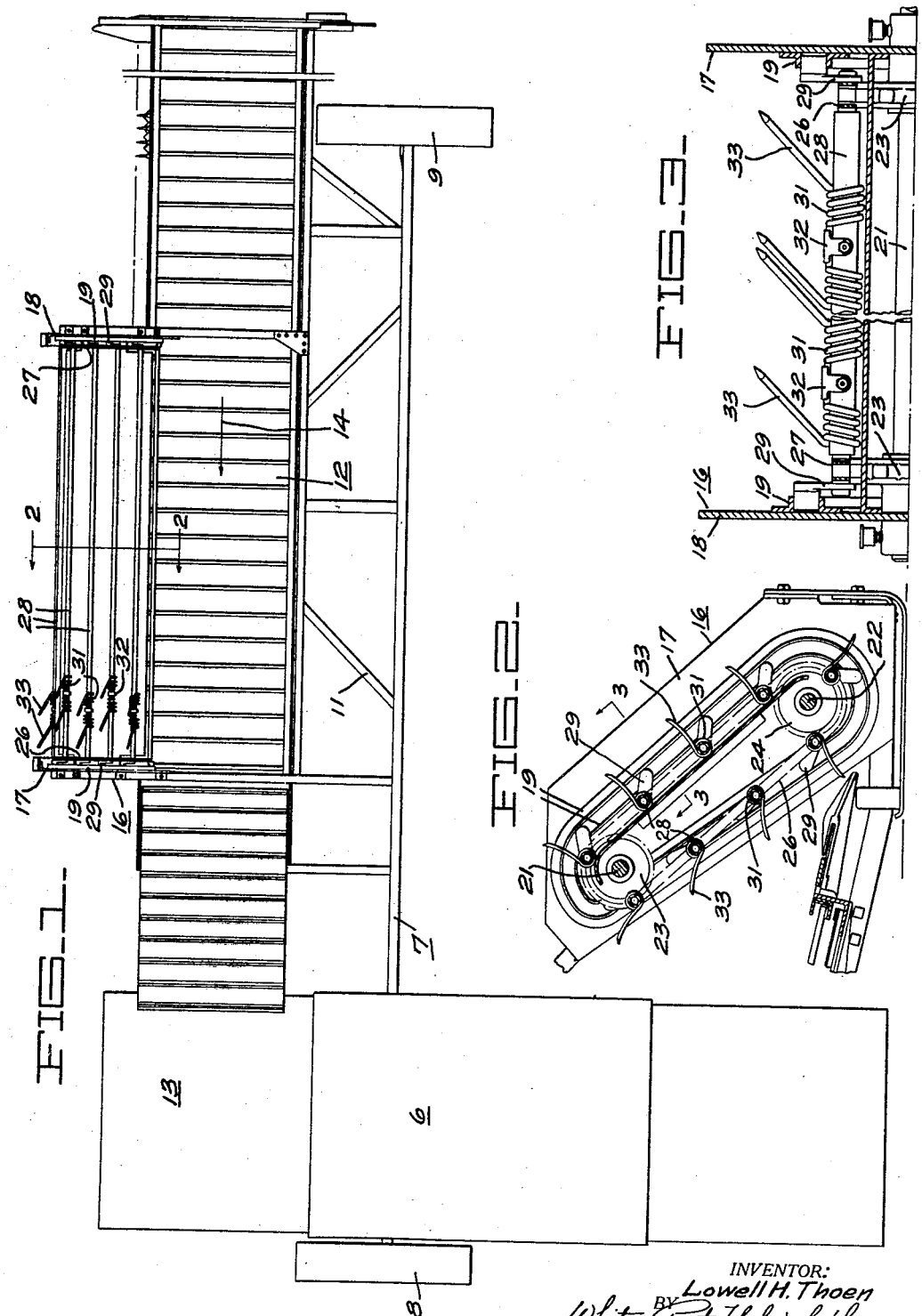

1,830,299

UNITED STATES PATENT OFFICE

LOWELL H. THOEN, OF STOCKTON, CALIFORNIA, ASSIGNOR TO CATERPILLAR TRACTOR CO., OF SAN LEANDRO, CALIFORNIA, A CORPORATION OF CALIFORNIA

PICK-UP CONSTRUCTION

Application filed February 3, 1930. Serial No. 425,442.

My invention relates to harvesting machinery and is particularly concerned with machinery adapted to be propelled over a field in which cut grain is lying on the ground in windrows or in bundles, for picking up the cut grain and transferring it as desired, customarily to a threshing mechanism. Such devices are usually termed pick-ups in the art and it is in connection with them that I shall describe my invention although it is capable of use in a wide variety of different environments.

Pick-ups of the character referred to usually comprise a framework having a conveyor on which is mounted a plurality of spikes or tangs which are suitably propelled to engage grain lying on the field, ordinarily in windrows. The tangs are usually arranged in the direction of motion of the pick-up in advancing into the grain and carry the picked up grain in an opposite direction to a conveyor or draper for carrying the grain to the separating mechanism.

It is an object of my invention to provide a pick-up construction in which the tangs are more than usually effective to engage grain lying on the ground in windrows.

Another object of my invention is to provide a pick-up construction in which the tangs are less liable to injury by shock.

The foregoing and other objects are attained in the embodiment of the invention shown in the drawings, in which Fig. 1 is a plan of a pick-up construction in accordance with my invention.

Fig. 2 is a cross section on the line 2—2 of Fig. 1.

Fig. 3 is a cross section on the line 3—3 of Fig. 2.

In its preferred form, the pick-up construction of my invention preferably includes a pick-up frame on which movable tangs are mounted, the tangs being arranged to project in a direction having a component generally transverse of the direction of advance of the pick-up frame.

In the form of my invention disclosed in the drawings, there is provided a separator unit 6 of a combined harvester which is mounted on an axle 7 supported by wheels 8 and 9. Fastened to the axle is a framework 11 carrying the customary draper 12 which extends from the outboard end of the framework adjacent the wheel 9 to the feeder house 13 of the separator 6. The draper is driven in a suitable fashion with its upper run traveling in the direction of arrow 14 appearing in Fig. 1. The pick-up mechanism is driven in the well-known manner from the source of power on the machine which operates the threshing and separating mechanisms.

Secured to the framework 11 is a pick-up frame 16 which supports end boards 17 and 18 carrying cam tracks 19. Journalled in the end boards are shafts 21 and 22 each of which is provided with a pair of sprockets 23 and 24 for receiving a pair of chains 26 and 27. Mounted in the parallel chains 26 and 27 is a plurality of tang bars 28 which are freely rotatable except for the constraint afforded by crank arms 29 affixed to the opposite ends of each of the tang bars and running in the cam tracks 19. The shape of the cam tracks is such that the tang bars are given a predetermined amount of angular movement about their own axes as they travel in the closed path of the chains 26 and 27.

On each of the tang bars are secured wire springs 31 which are preferably reversely coiled about the bars and held securely by central clips 32. The extremities 33 of each of these springs extend, when viewed in Fig. 2, tangentially from the tang bars. The projecting portions 33 ordinarily are disposed in the direction of advance of the pick-up unit but, in accordance with my invention, I preferably incline the tang bars in such a manner that they have a directional component in the general direction of advance of the draper 12, which is indicated by the arrow 14 in Fig. 1.

By appending and inclining the tangs as disclosed in Figs. 1 and 3 I increase their capability of engaging grain which is lying in the field to be picked up inasmuch as the tangs approximately overlap so that all of the swath of the machine is combed by tangs. Furthermore, by inclining the tangs in this manner they are less liable to injury by shock upon striking hard objects on the field such as rocks or stumps. They are capable of marked deflection when so striking and of approaching the tang bars quite closely, and due to this resiliency are not damaged by such contacts. In addition, the inclination of the tangs in the direction of motion of the draper facilitates the discharge thereto of the grain which has been engaged and picked up.

It is to be understood that I do not limit myself to the form of the pick-up construction shown and described herein, as the invention, as set forth in the following claims may be embodied in a plurality of forms.

I claim:

1. A pick-up construction comprising a pick-up frame, a draper supported on said frame for movement transversely thereof in one direction, a tang mounting supported on said frame for movement toward said draper, and tangs projecting from said mounting and bent in the direction of movement of said draper.

2. A pick-up construction comprising a pick-up frame adapted to progress over the ground in a predetermined direction, a tang mounting on said frame disposed with its axis substantially parallel with the ground and transversely of said predetermined direction, and a tang on said mounting disposed at an acute angle to the axis of said mounting.

3. A pick-up construction comprising a mounting bar, and a tang on said bar lying in a plane tangent to said bar and disposed with the axis of said tang at an acute angle to the axis of said bar.

4. A pick-up construction comprising a mounting bar, and a wire mounted on said bar with its extremities projecting at an acute angle to the axis of said bar to form tangs.

5. A pick-up construction comprising a mounting bar, a wire having its mid-portion coiled about said bar and its extremities projecting at an acute angle to the axis of said bar to form tangs, and means for securing said wire to said bar.

In testimony whereof, I have hereunto set my hand.

LOWELL H. THOEN.